UNITED STATES PATENT OFFICE.

WILLIAM A. LORENZ, OF HARTFORD, CONNECTICUT.

COFFEE SUBSTITUTE.

1,230,184. Specification of Letters Patent. Patented June 19, 1917.

No Drawing. Application filed August 2, 1916. Serial No. 112,715.

*To all whom it may concern:*

Be it known that I, WILLIAM A. LORENZ, a citizen of the United States, residing at Hartford, in the county of Hartford and State of Connecticut, have invented new and useful Improvements in Coffee Substitutes, of which the following is a specification.

My invention relates in general to the production of an improved beverage material in granular form, and the process of preparing the same for a beverage. Various non-alcoholic beverages have been made from a mixture of grains, bran, caramelized sugar or molasses, fruits and other ingredients.

The subject of the present invention is an improvement on beverage materials in general in that the article acquires a coffee aroma and a coffee taste before preparation, as a beverage, and after this preparation. It has also an agreeable and a lasting taste.

I accomplish this desirable object by utilizing cotton seeds which are roasted preferably to a dark brown color, and by grinding or pulverizing these roasted seeds; the beverage is produced by boiling this granular material for a suitable length of time, and then serving the beverage with cream and sugar to taste.

In order to produce a beverage of a different flavor, the roasted and ground cotton seeds are mixed with roasted and ground grain such as wheat or rye in suitable proportions; a different flavor can be produced by the further addition of a ground and roasted fruit, such as prunes or figs. I have discovered that the roasted and ground cotton seeds thus prepared, either with the hulls or without them, have a strong coffee aroma and flavor. It is believed that the use of cotton seeds, either alone or with the addition of other materials, properly roasted and ground, comprises a new discovery, and I wish to broadly claim that substance for non-alcoholic beverages.

Numerous proportions of materials have been tested, and a very palatable beverage is produced by the following mixture:— roasted and ground cotton seeds, 30%; roasted and ground rye, 30%; roasted and ground figs, 40%. These proportions may be varied considerably. The beverage however, may be made from the roasted and ground cotton seeds alone, or with the addition of other materials which may be determined according to the flavor required by the user.

I have discovered that when treated with boiling water ground roasted cotton seeds give off a delightful pungent odor closely approximating the aroma of coffee, that ground roasted figs darken the color and enrich the flavor by adding the bitter sweetness of the caramelized sugar which they contain, and that the dark hulls of roasted rye and the dextrin produced from the starch in the grain tone the flavor and color of the beverage when these ingredients are combined.

I claim as my invention:—

1. A composition for making a beverage consisting of granulated roasted cotton seeds and granulated roasted vegetable coloring and flavoring matter.

2. A composition for making a beverage consisting of granulated roasted cotton seeds, granulated roasted cereal, and granulated roasted fruit.

3. A composition for making a beverage consisting of granulated roasted cotton seeds, granulated roasted rye, and granulated roasted figs.

WILLIAM A. LORENZ.